US009720928B2

(12) United States Patent
Raghuwanshi et al.

(10) Patent No.: US 9,720,928 B2
(45) **Date of Patent: *Aug. 1, 2017**

(54) REMOVING OVERLAPPING RANGES FROM A FLAT SORTED DATA STRUCTURE

(71) Applicant: NetApp, Inc., Sunnyvale, CA (US)

(72) Inventors: Rohini Raghuwanshi, Banglore (IN); Ashish Shukla, Hyderabad (IN); Praveen Killamsetti, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 458 days.

This patent is subject to a terminal disclaimer.

(21) Appl. No.: 14/518,403

(22) Filed: Oct. 20, 2014

(65) Prior Publication Data

US 2015/0039572 A1 Feb. 5, 2015

Related U.S. Application Data

(63) Continuation of application No. 13/409,315, filed on Mar. 1, 2012, now Pat. No. 8,868,520.

(51) Int. Cl.
*G06F 17/30* (2006.01)
*G06F 11/10* (2006.01)
*G06F 11/14* (2006.01)

(52) U.S. Cl.
CPC .... *G06F 17/30156* (2013.01); *G06F 11/1004* (2013.01); *G06F 11/1453* (2013.01);
(Continued)

(58) Field of Classification Search
CPC ........... G06F 17/30156; G06F 11/1004; G06F 11/1453; G06F 17/30088; G06F 17/30091; G06F 30/159
See application file for complete search history.

(56) References Cited

U.S. PATENT DOCUMENTS 5,359,729 A 10/1994 Yarnell et al.
7,689,633 B1 3/2010 Li et al.
(Continued)

FOREIGN PATENT DOCUMENTS

JP 2009543198 12/2009
WO WO-2008005211 A2 1/2008

OTHER PUBLICATIONS

Macko, Peter, Margo I. Seltzer, and Keith A. Smith. "Tracking Back References in a Write-Anywhere File System." In FAST, pp. 15-28. 2010.*

(Continued)

*Primary Examiner* — Jason Liao
*Assistant Examiner* — Jesse P Frumkin
(74) *Attorney, Agent, or Firm* — Gilliam IP PLLC

(57) ABSTRACT

A system can efficiently removes ranges of entries from a flat sorted data structure that represent stale fingerprints As part of fingerprint verification during deduplication, the system performs an attributes intersect range calculation (AIRC) procedure on the stale fingerprint data structure to compute a set of non-overlapping and latest consistency point (CP) ranges. During the AIRC procedure, an inode associated with a data container is selected and the FBN tuple of each deleted data block in the file is sorted in a predefined FBN order. The AIRC procedure then identifies the most recent fingerprint associated with a deleted data block. The set of non-overlapping and latest CP ranges is then used to remove stale fingerprints associated with that deleted block from the fingerprint database. A single pass through the fingerprint database identifies the set of non-overlapping and latest CP ranges, thereby improving efficiency of the storage system.

20 Claims, 14 Drawing Sheets

(52) U.S. Cl.
CPC .. *G06F 17/30088* (2013.01); *G06F 17/30091* (2013.01); *G06F 17/30159* (2013.01)

(56) References Cited

U.S. PATENT DOCUMENTS

| | | | | |
|---|---|---|---|---|
| 7,747,663 | B2 | 6/2010 | Atkin et al. | |
| 7,849,057 | B1 | 12/2010 | Kazar et al. | |
| 8,108,446 | B1 | 1/2012 | Christiaens | |
| 2002/0194529 | A1* | 12/2002 | Doucette | G06F 11/2064 714/6.12 |
| 2003/0084242 | A1* | 5/2003 | Strange | G06F 11/2082 711/114 |
| 2006/0184652 | A1* | 8/2006 | Teodosiu | H03M 7/30 709/221 |
| 2006/0236152 | A1 | 10/2006 | Archer et al. | |
| 2008/0005141 | A1 | 1/2008 | Zheng et al. | |
| 2008/0195892 | A1 | 8/2008 | Archer et al. | |
| 2008/0215916 | A1 | 9/2008 | Archer et al. | |
| 2008/0243878 | A1* | 10/2008 | de Spiegeleer | G06F 11/1448 |
| 2010/0299311 | A1 | 11/2010 | Anglin et al. | |
| 2011/0282932 | A1* | 11/2011 | Ramjee | H04L 67/1002 709/203 |
| 2012/0158670 | A1* | 6/2012 | Sharma | G06F 3/0608 707/692 |
| 2012/0203742 | A1 | 8/2012 | Goodman et al. | |
| 2012/0290537 | A1 | 11/2012 | Smith et al. | |
| 2013/0018932 | A1* | 1/2013 | Bhaskar | H03M 7/3088 708/203 |
| 2014/0223029 | A1* | 8/2014 | Bhaskar | H03M 7/3088 709/247 |
| 2014/0223030 | A1* | 8/2014 | Bhaskar | H03M 7/3088 709/247 |

OTHER PUBLICATIONS

Alvarez C., "NetApp Deduplication for FAS and V-Series Deployment and Implementation Guide," Technical Report TR-3505, Jan. 2010, 46 pages.

Alvaraez, Carlos, "NetApp deduplication for FAS and V-Series deployment and implementation guide." Technical Report TR-3505 (2011).

Hong, Bo, et al. "Duplicate Data Elimination in a SAN File System." In Proceedings of the 12$^{th}$ NASA Goddard, 21$^{st}$ IEEE Conference on Mass Storage Systems and Technologies (MSST 2004), pp. 301-314, 2004.

System, Method, and Service for Automated Capacity Expansion of a Data Deduplication Repository; IP.com Prior Art Database Disclosure; IP.com Disclosure No. IPCOM000184411D; Implementing IBM Storage Data Deduplication Solutions; An IBM Redbook Publication; IBM Redbook Form No. SG24-7888-00; ISBN: 0738435244; ISBN: 9780738435244.

* cited by examiner

900

| | |
|---|---|
| FINGERPRINT | 800 |
| INODE NUMBER | 905 |
| FBN | 910 |
| GENERATION NUMBER | 915 |
| CP COUNT | 920 |
| ⋮ | 925 |

REMOVING OVERLAPPING RANGES FROM A FLAT SORTED DATA STRUCTURE

RELATED APPLICATION

The present application is a continuation of U.S. patent application Ser. No. 13/409,315, entitled "SYSTEM AND METHOD FOR REMOVING OVERLAPPING RANGES FROM A FLAT SORTED DATA STRUCTURE", filed on Mar. 1, 2012 by Rohini Raghuwanshi et al., the contents of which are incorporated by reference herein in their entirety.

FIELD OF THE INVENTION

The present invention relates to storage systems and, more specifically, to a technique for efficiently reducing duplicate data in a storage system.

BACKGROUND OF THE INVENTION

It is common to find duplicate blocks of data in a large file system of a storage system. Duplication of data blocks may occur when, for example, two or more files (or other data containers) of the file system share common data. Duplication of data blocks typically results in inefficient use of storage space consumed by the storage system because identical copies of the data are stored in multiple, different locations served by the storage system.

There are well known systems for de-duplicating duplicate data in such a file system. These system typically employ data deduplication operations which are performed on fixed size blocks, e.g., 4 kilobytes (KB) in size. When a new block is to be stored on the storage system, a hash value is typically utilized as an identifier or "fingerprint" of the 4 KB block, wherein the hash value may be computed on the block in accordance with a well-known mathematical function such as, e.g., a checksum function. The fingerprint may then be compared with a database containing fingerprints of previously stored blocks (i.e. a fingerprint database). Should the new block's fingerprint be identical to that of a previously stored block, there is a high degree of probability that the new block is an identical copy of the previously stored block. In such a case, the new block may be replaced with a pointer to the previously stored block, thereby reducing storage space consumption.

A noted disadvantage of these well-known de-duplication systems is that the fingerprint database may accumulate stale fingerprints. A stale fingerprint, as used herein, is a fingerprint that does not identify the current state of a corresponding block in the file system. Stale fingerprints may be generated due to deletion of files, truncation of files or as a result of certain file system operations including, e.g., hole punching. Hole punching is a technique utilized to reclaim storage space in response to data deletion in certain environments, e.g., in an environment wherein a data container having a first data layout format is overlaid onto a storage space having a second data layout format. As will be appreciated by one skilled in the art, an operation that deletes a block from the file system, but does not write or overwrite the block, may result in a stale fingerprint. As the fingerprint database is typically stored in memory or secondary storage of the storage system, storage of stale fingerprints may cause consumption of additional storage system resources (such as memory and/or storage space). Further, as the size of the fingerprint database increases, the time required to perform certain operations, such as search operations during de-duplication, increases, thereby reducing storage system efficiency.

One technique to eliminate stale fingerprints is to log the blocks which have been deleted in a stale fingerprint data structure and then utilize a known data structure, such as a binary search tree (BST), to identify the most recent fingerprints associated with each deleted block. A noted disadvantage of such a technique is that the BST approach operates with a complexity of $O(n^2)$. As will be appreciated by one skilled in the art, this technique quickly becomes cumbersome as the number of deleted blocks increases in a large file system.

SUMMARY OF THE INVENTION

The present invention overcomes the disadvantage of the prior art by providing a system and method for efficiently removing ranges of entries from a flat sorted data structure, such as a fingerprint database, of a storage system. The ranges of entries represent fingerprints that have become stale, i.e., are not representative of current states of corresponding blocks in the file system, due to various file system operations such as, e.g., deletion of a data block without overwriting its contents. In response to a user command, or automatically in response to certain thresholds being met, a deduplication module of a file system executing on the storage system performs a fingerprint verification procedure to remove the stale fingerprints from the fingerprint database. To that end, the deduplication module interacts with a stale fingerprint data structure, which is configured to log stale fingerprints as they are generated in the file system.

As part of the fingerprint verification procedure, the deduplication module performs an attributes intersect range calculation (AIRC) procedure on the stale fingerprint data structure to compute a set of non-overlapping and latest consistency point (CP) ranges. As used herein, a CP range is defined as a file block number (FBN) tuple including a starting FBN, ending FBN and CP count associated with a FBN of, e.g., a deleted data block. The set of non-overlapping and latest CP ranges is the set of CP ranges that do not overlap (i.e., have no FBN values in common) and are associated with the highest (most recent in time) CP count of a deleted block.

During the AIRC procedure, an inode associated with a data container, e.g., a file, is selected and the FBN tuple of each deleted data block in the file is sorted in a predefined, e.g., increasing, FBN order. The AIRC procedure then identifies the most recent fingerprint associated with a deleted data block. The output from the AIRC procedure, i.e., the set of non-overlapping and latest CP ranges, is then used to remove stale fingerprints associated with that deleted block (as well as each other deleted data block) from the fingerprint database. Notably, only a single pass through the fingerprint database is required to identify the set of non-overlapping and latest CP ranges, thereby improving efficiency of the storage system.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF ILLUSTRATIVE EMBODIMENTS

A. Storage System Environment

Figure 1:
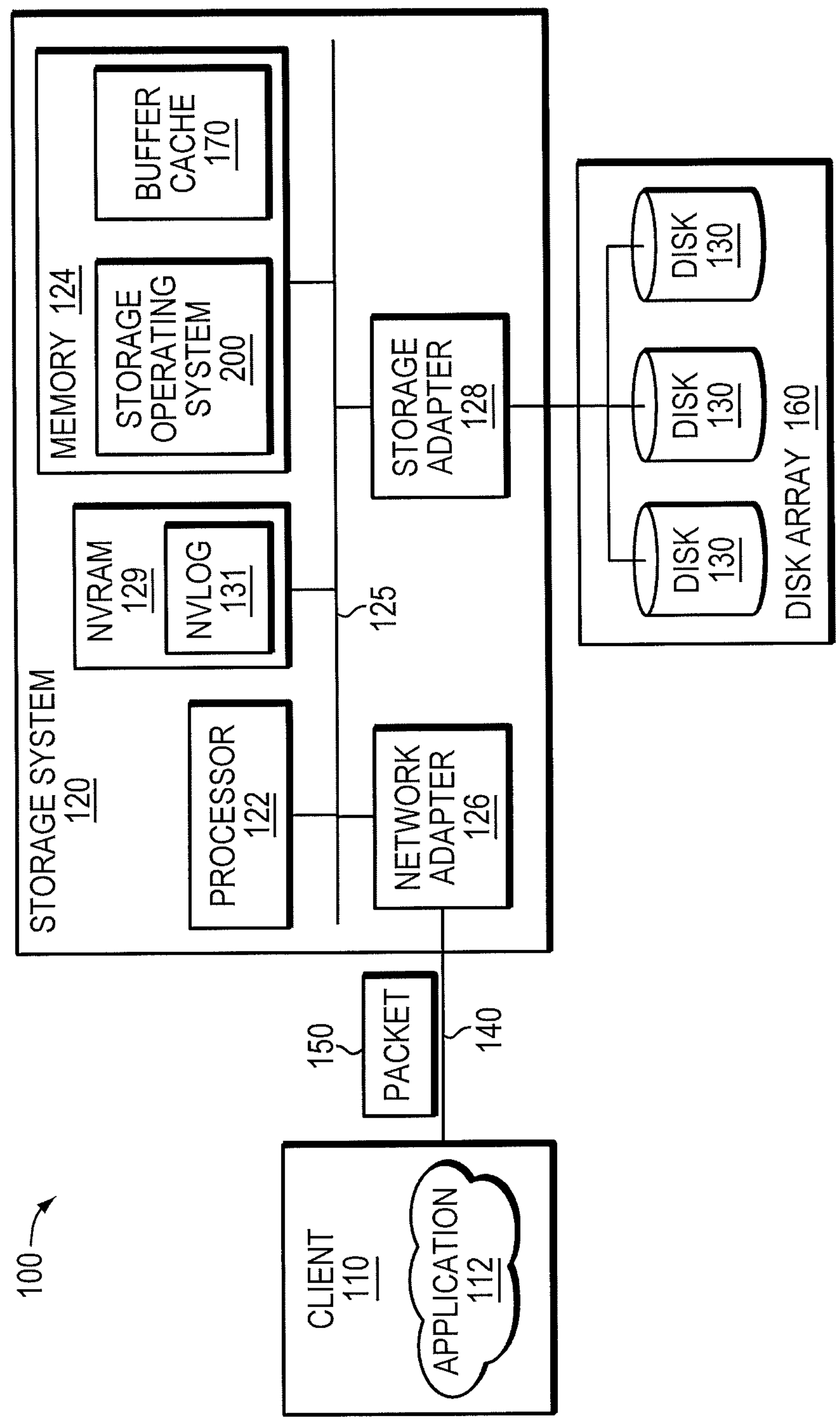
FIG. 1 is a schematic block diagram of storage system environment in accordance with an illustrative embodiment.

FIG. 1 is a schematic block diagram of an illustrative storage system environment 100 including a storage system 120 that may be advantageously used with an illustrative embodiment described herein. The storage system is a computer that provides storage service relating to the organization of information on storage devices, such as disks 130 of a disk array 160. The storage system 120 comprises a processor 122, a memory 124, a network adapter 126, a non-volatile random access memory (NVRAM) 129 and a storage adapter 128 interconnected by a system bus 125. The storage system 120 also includes a storage operating system 200 that illustratively implements a high-level module, such as a file system, to logically organize the information as a hierarchical structure of data containers, such as directories, files, and special types of files called virtual disks (hereinafter "blocks"), on the disks.

In the illustrative embodiment, the memory 124 comprises storage locations that are addressable by the processor 122 and adapters for storing software program code. A portion of the memory may be further organized as a "buffer cache" 170 for storing data structures, such as various fingerprint data structures, associated with the present invention. Alternatively, the NVRAM 129 may be utilized to store the fingerprint data structures, including a fingerprint queue, a fingerprint database, or any other data structures associated with the present invention. Additionally, in a system supporting persistent consistency point images (PCPIs) of the file system, the NVRAM 129 may be utilized for storing changes to the file system between consistency points (CPs). Indications of such changes may be stored in a nonvolatile log (NVLOG) 131 until those changes are written to disk during a CP.

The processor 122 and adapters may comprise processing elements and/or logic circuitry configured to execute the software program code and to manipulate the data structures. Storage operating system 200, portions of which are typically resident in memory and executed by the processing elements, functionally organizes the system 120 by, inter alia, invoking storage operations executed by the storage system. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the storage system 120 to a computer network 140, which may comprise a point-to-point connection or a shared medium, such as a local area network. Illustratively, the computer network 140 may be embodied as an Ethernet network or a Fibre Channel (FC) network. A client 110 may communicate with the storage system over network 140 by exchanging discrete frames or packets 150 of data according to pre-defined protocols, such as the Transmission Control Protocol/Internet Protocol (TCP/IP).

The storage adapter 128 cooperates with the storage operating system 200 executing on the system 120 to access information, e.g., requested by a user. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on disks 130, such as hard disk drives (HDDs) and/or direct access storage devices (DASDs), of array 160. The storage adapter 128 includes input/output (I/O) interface circuitry that couples to the disks 130 over an I/O interconnect arrangement, such as a conventional high-performance, FC serial link topology.

Storage of information on array 160 is preferably implemented as one or more storage "volumes" that comprise a collection of physical storage disks 130 cooperating to define an overall logical arrangement of volume block number (VBN) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID), managed according to a RAID protocol. Most RAID implementations, such as a RAID-4 level implementation, enhance the reliability/integrity of data storage through the redundant writing of data "stripes" across a given number of physical disks in the RAID group, and the appropriate storing of parity information with respect to the striped data. The illustrative RAID protocol also implements a 32-bit checksum value for each block of data written to disk, to verify data integrity. The illustrative example of a RAID implementation is a RAID-4 level implementation, although it should be understood that other types and levels of RAID implementations may be used in accordance with the inventive principles described herein. Likewise, other implementations and/or protocols may be used to organize the disks of the logical volume/file system.

B. Storage Operating System

To facilitate access to the disks 130, the storage operating system 200 illustratively implements a write-anywhere file system that cooperates with virtualization modules to "virtualize" the storage space provided by disks 130. As noted, the file system logically organizes the information as a hierarchical structure of data containers, such as files, on the disks. Each "on-disk" file may be implemented as set of disk blocks configured to store information, such as the actual data for the file. These data blocks are organized within the VBN space maintained by the file system. The file system may also assign each data block in the file a corresponding "file offset" or file block number (FBN). The file system typically assigns sequences of FBNs on a per-file basis, whereas VBNs are assigned over a larger volume address space.

In the illustrative embodiment, the storage operating system is preferably the NetApp® Data ONTAP® operating system available from NetApp, Inc., Sunnyvale, Calif., that implements a Write Anywhere File Layout (WAFL®) file system. However, it is expressly contemplated that any appropriate storage operating system may be enhanced for use in accordance with the inventive principles described herein. As such, where the term "Data ONTAP" is employed, it should be taken broadly to refer to any storage operating system that is otherwise adaptable to the teachings of this invention.

Figure 2:
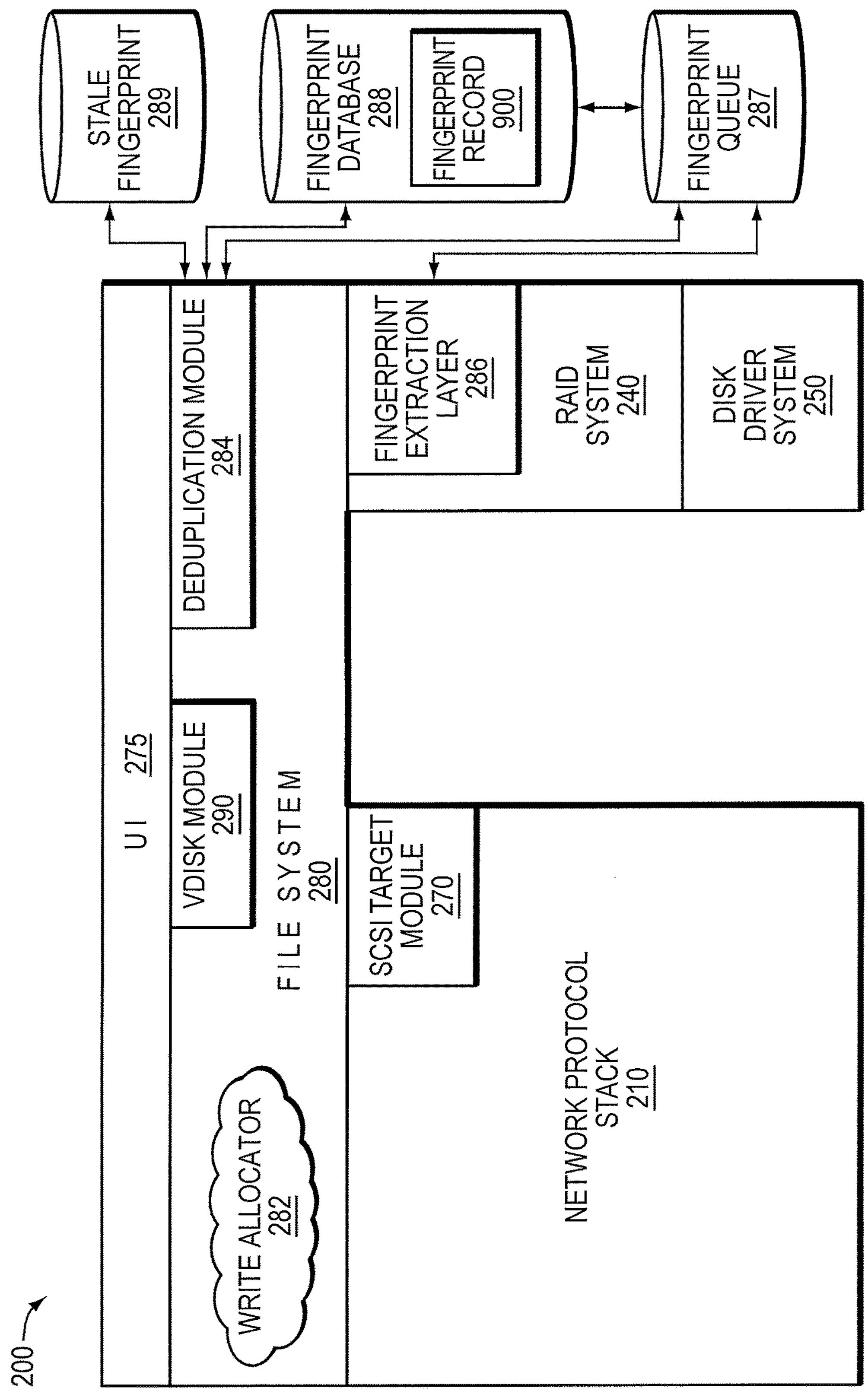
FIG. 2 is a schematic block diagram of a storage operating system in accordance with an illustrative embodiment.

FIG. 2 is a schematic block diagram of a storage operating system 200 that may be advantageously used with an illustrative embodiment described herein. The storage operating system comprises a series of software layers organized to form an integrated network protocol stack 210 that provides data paths for accessing information stored on the storage system using block and file access protocols. In addition, the storage operating system includes a storage module embodied as a RAID system 240 that implements a storage (e.g., RAID) protocol to manage the storage and retrieval of information to and from the volumes/disks in accordance with I/O operations, and a disk driver system 250 that implements a disk access protocol such as, e.g., a SCSI protocol.

Bridging the disk software layers with the integrated network protocol stack layers is a virtualization system that is implemented by a file system 280 interacting with virtualization modules illustratively embodied as, e.g., vdisk module 290 and SCSI target module 270. The vdisk module 290 is layered on the file system 280 to enable access by administrative interfaces, such as a user interface (UI) 275, in response to a user (system administrator) issuing commands to the storage system. The SCSI target module 270 provides a translation layer of the virtualization system between the block (lun) space and the file system space, where luns are represented as blocks. The UI 275 is disposed over the storage operating system in a manner that enables administrative or user access to the various layers and systems.

According to an illustrative embodiment, the storage operating system 200 further includes a deduplication module 284 and a fingerprint extraction layer 286 disposed between the file system 280 and the RAID system 240. The deduplication module 284 may execute a data duplication process periodically, in response to a predefined condition (e.g., the storage system reaching a predefined capacity), and/or in response to a command from an administrator or user, through the UI 275. The de-duplication module 284 may also execute a verification procedure 1200, described further below in reference to FIG. 12, that removes stale fingerprints from the fingerprint database 288. The deduplication module 284 and fingerprint extraction layer 286 communicate with a fingerprint queue 287 and a fingerprint database 288, each of which stores fingerprint records which, in turn, are used to identify duplicate data blocks. The de-duplication module 284 also communicates with a stale fingerprint data structure 289, which stores stale fingerprints.

The de-duplication module, in conjunction with the file system, generates entries, i.e., fingerprint records 900, of fingerprint database 288 that are associated with stale fingerprints as they are generated. A stale fingerprint may be the result of certain file system operations that do not involve directly overwriting or writing data. For example a file may be deleted, but the blocks previously allocated to the file may have not been overwritten. In such an example, the fingerprints would remain in the fingerprint database 288 for the deleted blocks. In accordance with an illustrative embodiment, the file system, in conjunction with the data de-duplication module, logs (stores) such stale fingerprints in the stale fingerprint data structure 289. The file system 280 logs these stale fingerprints in response to the file system executing an operation that generates a stale fingerprint.

Illustratively, the fingerprint queue 287, fingerprint database 288 and stale fingerprint data structure 289 reside in the storage system memory 124 and/or NVRAM 129 although, in alternate embodiments, they may be separately stored on secondary storage, e.g., disk and/or any other computer readable medium. Also, according to alternate embodiments, the deduplication module 284 may be integrated into a write allocator process 282, to perform a data deduplication procedure during the allocation of write operations to the disk array 160. Such a data deduplication procedure may modify pointers within indirect blocks to point to a single data block instead of multiple data blocks containing identical data.

The file system is illustratively a message-based system that provides logical volume management capabilities for use in access to the information stored on the storage devices, such as disks. That is, in addition to providing file system semantics, the file system 280 provides functions normally associated with a volume manager. These functions include (i) aggregation of the disks, (ii) aggregation of storage bandwidth of the disks, and (iii) reliability guarantees, such as mirroring and/or parity (RAID). The file system 280 illustratively implements a write-anywhere file system (such as the WAFL® file system available from NetApp, Inc., Sunnyvale, Calif.) having an on-disk format representation that is block-based using, e.g., 4 kilobyte (KB) blocks and using index nodes ("inodes") to identify files and file attributes (such as creation time, access permissions, size, and block location). The file system uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. A file system (FS) info block specifies the layout of information in the file system and includes an inode of a file that includes all other inodes of the file system. Each logical volume (file system) has an FS info block that is preferably stored at a fixed location within, e.g., a RAID group. The inode of the inode file may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file.

Operationally, the file system generates operations to load (retrieve) data requested by a read operation from disk 130 if it is not resident "in core", i.e., in the buffer cache 170. If the information is not in the cache, the file system 280 indexes into the inode file using the inode number to access an appropriate entry and retrieve a logical VBN. The file system then passes a message structure including the logical VBN to the RAID system 240; the logical VBN is mapped to a disk identifier and disk block number (disk, dbn) and sent to an appropriate driver (e.g., SCSI) of the disk driver system 250. The disk driver accesses the dbn from the specified disk 130 and loads the requested data block(s) in buffer cache 170 for processing by the storage system.

A write operation follows the same "path" through the storage system 100, except that the operation may be temporarily stored ("queued") in the NVLOG 131 of the NVRAM 129 until the data is actually written to disk 130. In addition, the fingerprint extraction layer 286 and/or deduplication module 284 may extract data, such as metadata associated with an appropriate entry in the inode file during the operation, in order to build a fingerprint record corresponding to the logical VBN modified by the write operation.

It should be noted that the software "path" through the storage operating system layers described above needed to perform data storage access and write operations for requests processed by the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 120. Moreover, in another alternate embodiment of the invention, the processing elements of adapters 126, 128 may be configured to offload some or all of the packet processing and storage access operations, respectively, from processor 122, to thereby increase the performance of the storage service provided by the system. It is expressly contemplated that the various processes, architectures and procedures described herein can be implemented in hardware, firmware or software operating as a single or distributed system.

As used herein, the term "storage operating system" generally refers to the computer-executable code operable to perform a storage function in a storage system, e.g., that manages data access and may, in the case of a file server, implement file system semantics. In this sense, the Data ONTAP® software is an example of such a storage operating system implemented as a microkernel and including the file system 280 to implement the WAFL® file system semantics and manage data access. Illustratively, the storage operating system 200 includes a deduplication module 284 for comparing fingerprints and implementing data deduplication. However, in alternate embodiments, the fingerprint comparison and data deduplication functionality may be implemented in other modules of the storage operating system 200. The storage operating system can also be implemented as an application program operating over a general-purpose operating system, such as UNIX® or Windows XP®, or as a general-purpose operating system with configurable functionality, which is configured for storage applications as described herein.

In addition, it will be understood to those skilled in the art that the inventive technique described herein may apply to any type of special-purpose (e.g., file server, filer, or multi-protocol storage appliance) or general-purpose computer, including a standalone computer or portion thereof, embodied as or including a storage system 120. Moreover, the teachings of this invention can be adapted to a variety of storage system architectures including, but not limited to, a network-attached storage environment, a storage area network, and a disk assembly directly-attached to a client or host computer. The term "storage system" should therefore be taken broadly to include such arrangements in addition to any subsystems configured to perform a storage function and associated with other equipment or systems.

C. On-Disk File System Structures

Figure 3:
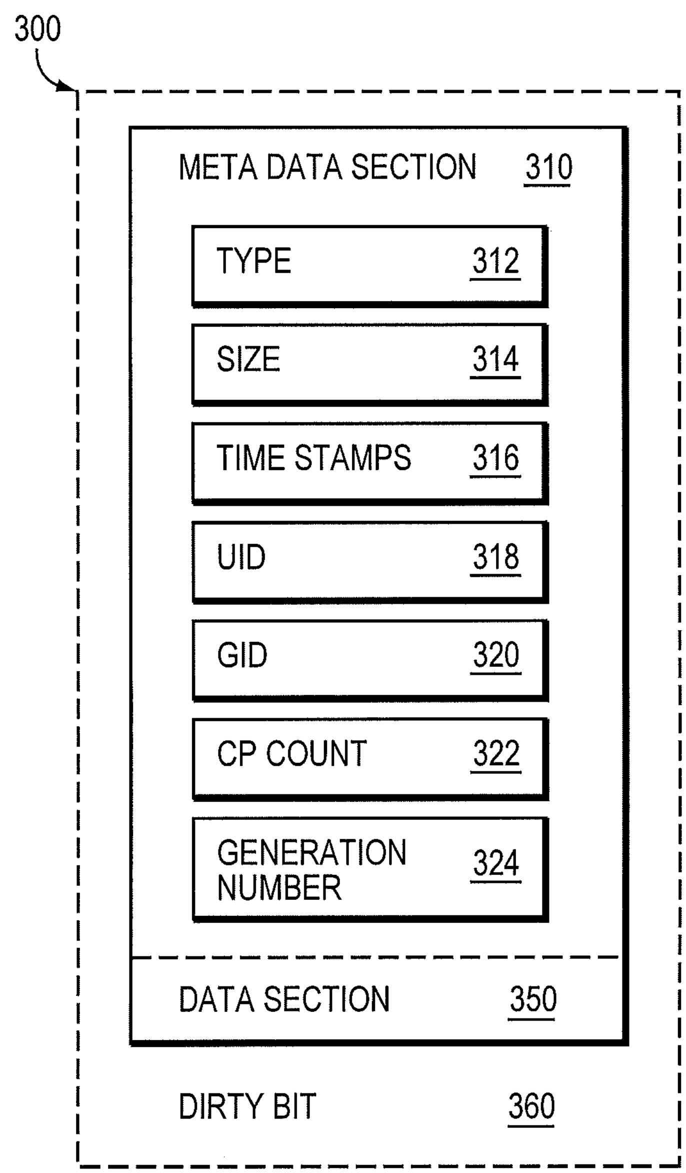
FIG. 3 is a schematic block diagram of an inode in accordance with an illustrative embodiment.

In an illustrative embodiment, a file (or other data container) is represented in the file system as an inode data structure adapted for storage on the disks 130. FIG. 3 is a schematic block diagram of an inode 300, which preferably includes a metadata section 310 and a data section 350. The information stored in the metadata section 310 of each inode 300 describes the file and, as such, includes the type (e.g., regular, directory, virtual disk) 312 of file, the size 314 of the file, time stamps (e.g., access and/or modification) 316 for the file, ownership, i.e., user identifier (UID 318) and group ID (GID 320), of the file, a consistency point (CP) count field 322, and a generation number field 324.

The CP count field 322 contains a unique identifier, e.g., a number ("CP count"), indicating the CP at which this particular version of the inode was generated. Illustratively, each CP is identified with a unique number that is generated by a monotonically increasing counter (a "CP counter"). In alternate embodiments, the CP count may be generated using other techniques to provide each CP with a unique identifier. The generation number field 324 contains a unique generation number that identifies the generation of this particular inode. Illustratively, each time the inode is deleted and reused, the number contained in its associated generation number field 324 is incremented. In the file system, any time a block (including an inode) is modified, a new copy of the inode is written to disk. At such time, i.e., during inode write allocation, these fields 322, 324 are updated. Thus, the generation number reflects inode creation/allocation, and the CP count reflects inode modification. The fields 322, 324 may be utilized to quickly determine whether a particular data container represented by the inode has been modified since the time a fingerprint of the data container was generated.

The contents of the data section 350 of each inode may be interpreted differently depending upon the type of file (inode) defined within the type field 312. For example, the data section 350 of a directory inode contains metadata controlled by the file system, whereas the data section of a regular inode contains file system data. In this latter case, the data section 350 may include a representation of the data associated with the file.

According to an illustrative embodiment, the data section 350 of a regular on-disk inode may include file system data or pointers, the latter referencing 4 KB data blocks on disk used to store the file system data. Each pointer is preferably a logical VBN to facilitate efficiency among the file system and the RAID system 240 when accessing the data on disks. Given the restricted size (e.g., 128 bytes) of the inode, file system data having a size that is less than or equal to 64 bytes is represented, in its entirety, within the data section of that inode. However, if the file system data is greater than 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section 350 of the inode (e.g., a second level inode) references an indirect block (e.g., a first level block) that contains 1024 pointers, each of which references a 4 KB data block on disk. For file system data having a size greater than 64 MB, each pointer in the data section 350 of the inode (e.g., a third level inode) references a double-indirect block (e.g., a second level block) that contains 1024 pointers, each referencing an indirect (e.g., a first level) block. The indirect block, in turn, contains 1024 pointers, each of which references a 4 KB data block on disk. When accessing a file, each block of the file may be loaded from disk 130 into the buffer cache 170.

When an on-disk inode (or block) is loaded from disk 130 into buffer cache 170, its corresponding in core structure embeds the on-disk structure. For example, the dotted line surrounding the inode 300 indicates the in core representation of the on-disk inode structure. The in core structure is a block of memory that stores the on-disk structure plus additional information needed to manage data in the memory (but not on disk). The additional information may include, e.g., a "dirty" bit 360. After data in the inode (or block) is updated/modified as instructed by, e.g., a write operation, the modified data is marked "dirty" using the dirty bit 360 so that the inode (block) can be subsequently written to disk.

Figure 4:
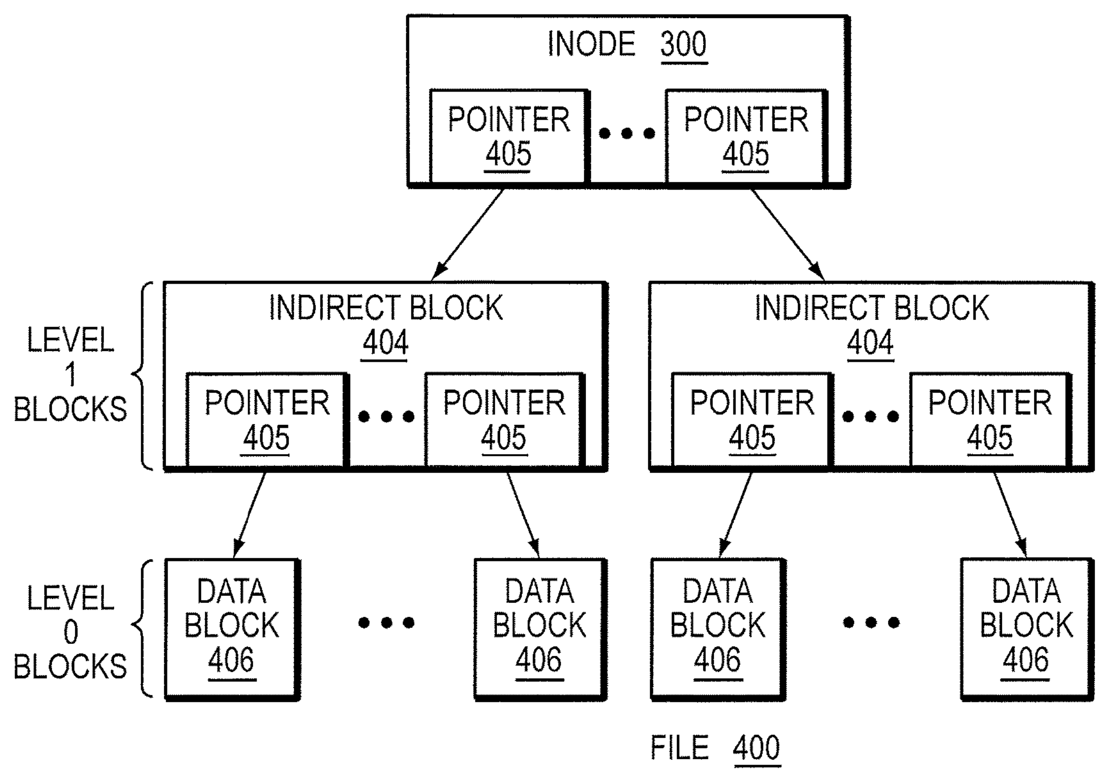
FIG. 4 is a schematic block diagram of a buffer tree of a data container in accordance with an illustrative embodiment.

FIG. 4 is a schematic block diagram of a buffer tree of a data container that may be advantageously used with an illustrative embodiment described herein. The buffer tree is an internal representation of blocks for a data container (e.g., file 400) loaded into the buffer cache 170 and maintained by the file system 280. A root (top-level) inode 300, such as an embedded inode, references indirect (e.g., level 1) blocks 404. Both the indirect blocks 404 and inode 300 contain pointers 405 that ultimately reference data blocks 406 used to store the actual data of file 400. That is, the data of file 400 are contained in data blocks and the locations of these blocks are stored in the indirect blocks of the file. Each level 1 indirect block 404 may contain pointers to as many as 1024 data blocks. According to the "write anywhere" nature of the file system, these blocks may be located anywhere on the disks 130.

D. Data Deduplication

Figure 5:
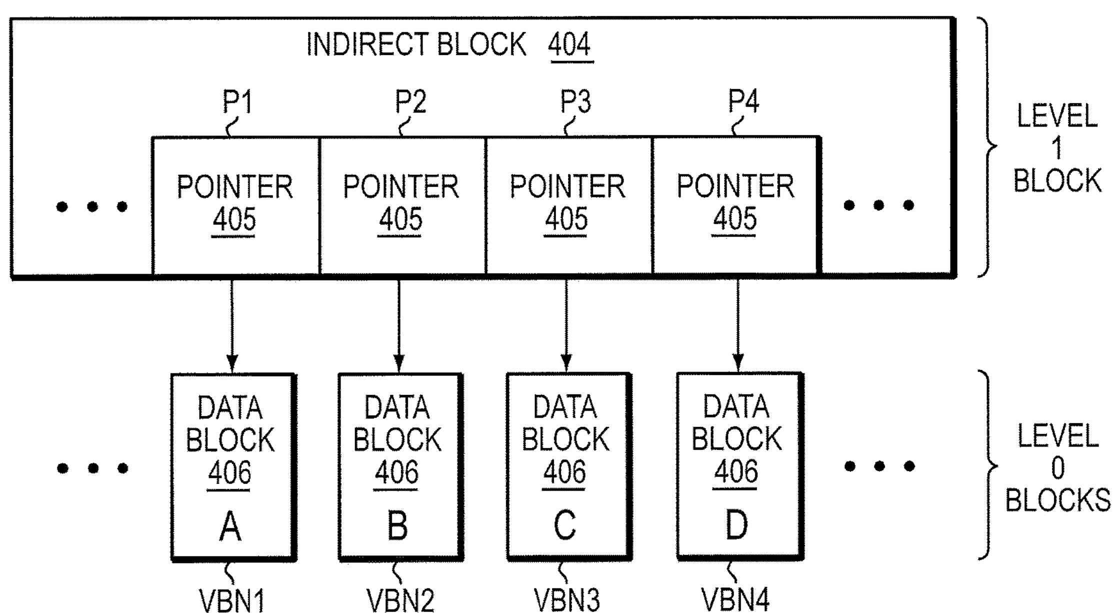
FIG. 5 is a schematic block diagram of an indirect block with pointers to data blocks in accordance with an illustrative embodiment.

FIG. 5 is a schematic block diagram of a level 1 indirect block 404 having pointers to a data blocks 406 in accordance with an illustrative embodiment described herein. Illustratively, each data block 406 contains 4 KB of data. In the case of a write anywhere file layout, the level 0 data blocks may be located anywhere in the file system (i.e., they do not necessarily correspond to physically sequential blocks on a disk 130). In a storage operating system 200 adapted to eliminate and/or deduplicate data, the data within each data block 406 may be associated with a fingerprint. For example, the illustrative data container contains a sequence of data blocks stored at, e.g., VBN1, VBN2, VBN3, and VBN4. Each unique data block is associated with a unique fingerprint, e.g., A, B, C, and D. Likewise, within the indirect block 404, a sequence of pointers, 405 e.g., P1, P2, P3, and P4, reference the data blocks VBN1, VBN2, VBN3, and VBN4 respectively.

Figure 6:
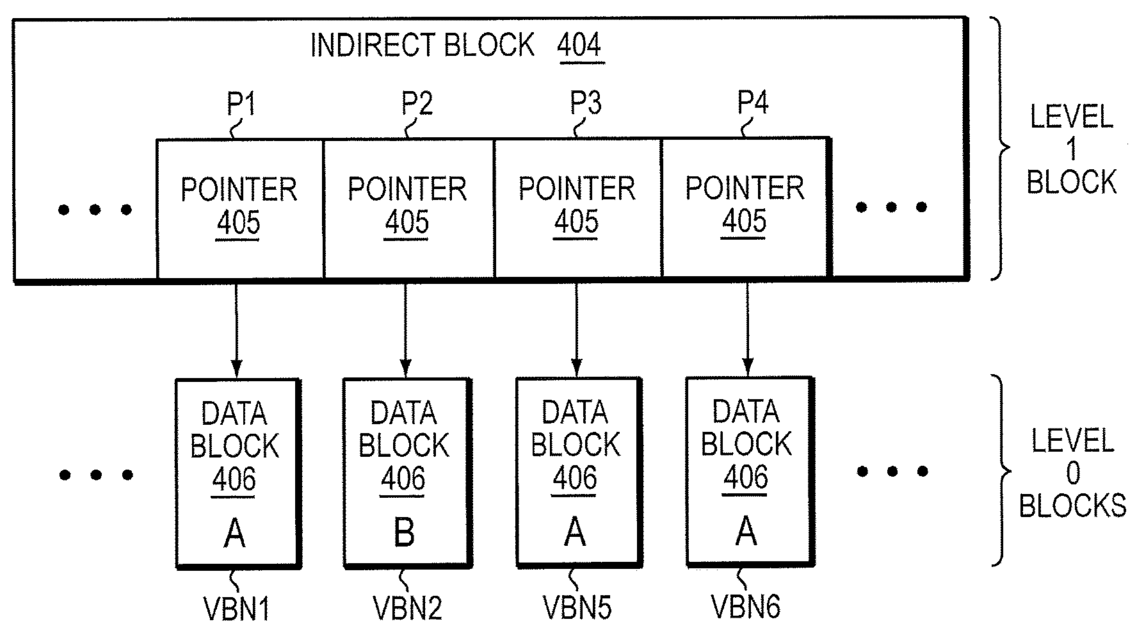
FIG. 6 is a schematic block diagram of an indirect block with pointers to modified data blocks in accordance with an illustrative embodiment.
Figure 7:
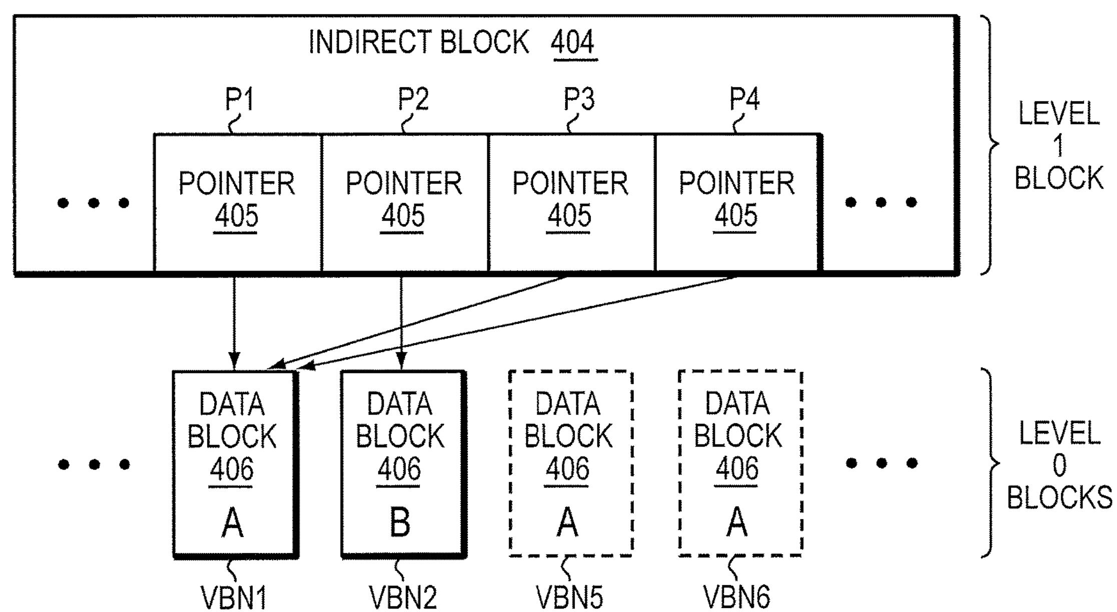
FIG. 7 is a schematic block diagram of an indirect block with pointers to deduplicated data blocks in accordance with an illustrative embodiment.

FIG. 6 is a schematic block diagram of the level 1 indirect block 404 of FIG. 5 after write operations have modified the data container. Illustratively, the two data blocks previously stored at VBN3 and VBN4 have been modified to contain copies of the first data block stored at VBN 1, thereby making their associated fingerprints identical. The resulting data blocks are thus associated with fingerprints A, B, A, and A respectively. In the case of a write anywhere file layout, two new VBNs (VBN5 and VBN6) are allocated for the modified data. As a result, the deduplication module 284 may analyze the identical fingerprints to determine that the data blocks 406 stored at VBN5 and VBN6 contain a duplicate of the data stored in the data block 406 at VBN1. Having three copies of identical data is wasteful of storage system resources including storage space; therefore the deduplication module 284 may perform de-duplication by, e.g, modifying pointers P3 and P4 to reference VBN1, thereby de-allocating VBN5 and VBN6 and conserving storage space while preserving the integrity of the data container. FIG. 7 is a schematic block diagram illustrating the level 1 indirect block 404 of FIG. 6 after performance of an exemplary data deduplication procedure. As can be seen, each unique data block is associated with a unique fingerprint, and references to copies of identical data blocks of the data container are directed to the copied data block.

E. Generating Fingerprint Records

As noted above, the storage system 120 implements a high-level module, such as a file system 280, to logically organize information stored on a plurality of storage devices, such as disks 130, managed by a storage module, such as RAID system 240. At an interface between the high-level module and the storage module, a fingerprint extraction layer 286 generates a fingerprint of a predefined size, e.g., 64 bits, for each data block 406 stored by the storage system 120. Illustratively, the fingerprint may be generated as follows: a first predetermined number of bits, e.g., the first 32 bits, may be provided from the result of a checksum calculation performed by the storage module, while a second predetermined number of bits, e.g., the second 32 bits, may be provided from data stored at one or more predefined offsets within the data block 406. In an alternative embodiment, the entire 64 bits of the fingerprint may be generated from the result of a separate calculation. It should be noted that for the purposes of removing stale fingerprints, any technique for generating fingerprints may be utilized. As such, the method of generating fingerprints described herein should be taken as exemplary only. The resulting fingerprint sufficiently reflects the contents of the data block 406 to enable identification of duplicates.

Figures 8, 9:
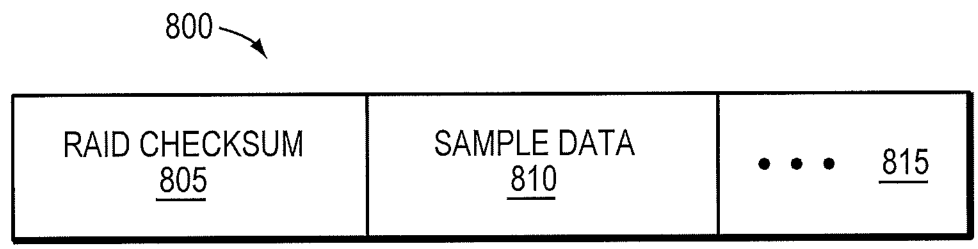
FIG. 8 is a schematic block diagram of a fingerprint in accordance with an illustrative embodiment.
FIG. 9 is a schematic block diagram of a fingerprint record in accordance with an illustrative embodiment.

FIG. 8 is a schematic block diagram showing elements of an exemplary fingerprint 800. The fingerprint 800 illustratively comprises a RAID checksum field 805, a sample data field 810, and, in alternate embodiments, additional fields 815. It should be noted that in alternate embodiments additional and/or differing fields may be utilized. Alternatively, the fingerprint 800 may comprise the RAID checksum alone if the RAID checksum comprises a checksum function that sufficiently meets the needs of the deduplication module.

As part of a typical write operation, the RAID protocol verifies data integrity by implementing a well-known checksum calculation for each block of data written to disk. Illustratively, for each write operation directed to a data block 406, the fingerprint extraction layer 286 identifies and copies a 32-bit checksum value, calculated according to the RAID protocol, into the RAID checksum field 805 of the fingerprint 800. Thus, the process of generating fingerprints may utilize a pre-calculated checksum value associated with each data block 406. Alternately, the RAID checksum field 805 may include only a portion of the 32-bit checksum value calculated according to the RAID protocol, either alone or in combination with other values. Likewise, where the storage protocol generates a checksum value other than a 32-bit RAID checksum value, the fingerprint 800 may implement this other checksum value in the RAID checksum field 805. Alternately, the RAID checksum field 805 may include the results of other cryptographic functions, including known hash functions, associated with data stored in the data block 406.

Illustratively, the sample data field 810 contains a copy of data stored at one or more predefined offsets within the data block 406 associated with the fingerprint 800. For example, where the data block 406 contains 4 KB of data, the sample data field 810 may be 32 bits (4 bytes) long, containing a copy of every 1024th bit (i.e., the first bit of every 128th byte) stored in the data block 406. Alternately, the sample data field 810 may contain a copy of 32 contiguous bits stored at a single offset within the data block 406. The resulting fingerprint 800 sufficiently reflects the contents of the data block 406 to enable identification of duplicates without an undesirable rate of false positives. According to the alternate embodiments, the RAID checksum field 805 and sample data field 810 may be combined with additional fields 815 containing other data associated with the data block 406, including, e.g., the result of additional hash function calculations and/or cryptographic functions performed by the storage operating system 200.

In an illustrative embodiment described herein, each fingerprint may be stored in a fingerprint record 900, and the fingerprint records may, in turn, be stored in fingerprint database 288 for access by the data deduplication module 284. The data deduplication module 284 may periodically compare the fingerprints to identify duplicate fingerprints which, in turn, indicate duplicate data blocks 406. The duplicate data blocks 406 are then compared, and duplicate data is eliminated.

FIG. 9 is a schematic block diagram of a fingerprint record 900 that may be advantageously used in accordance with an illustrative embodiment described herein. The fingerprint record 900 comprises a field for storing the fingerprint 800, an inode number field 905, a FBN field 910, a generation number field 915, a CP count field 920, and, in alternate embodiments, additional fields 925. The inode number field 905 stores a pointer to the inode 300 for the fingerprinted data block 406. The FBN field 910 stores the offset of the block within the data container. For example, where the data container includes a plurality of data blocks 406, a value in the FBN field 910 identifies which data block 406 corresponds to the fingerprint 800. The other fields 915, 920, 925 of the fingerprint record 900 may be gathered from the metadata section 310 of the block's inode 300 during a write operation. For example, the values stored in the CP count field 322 and the generation number field 324 of the inode 300 may be copied to the CP count field 920 and the generation number field 915 of the fingerprint record 900, respectively. Thus, the fingerprint record 900 stores data associated with the fingerprint 800 to provide additional fingerprint handling functionality to the storage operating system. Fingerprint records 900 may also be generated by the data de-duplication module 284 for storage in the stale fingerprint data structure 289 accordance with an illustrative embodiment.

Figure 10:
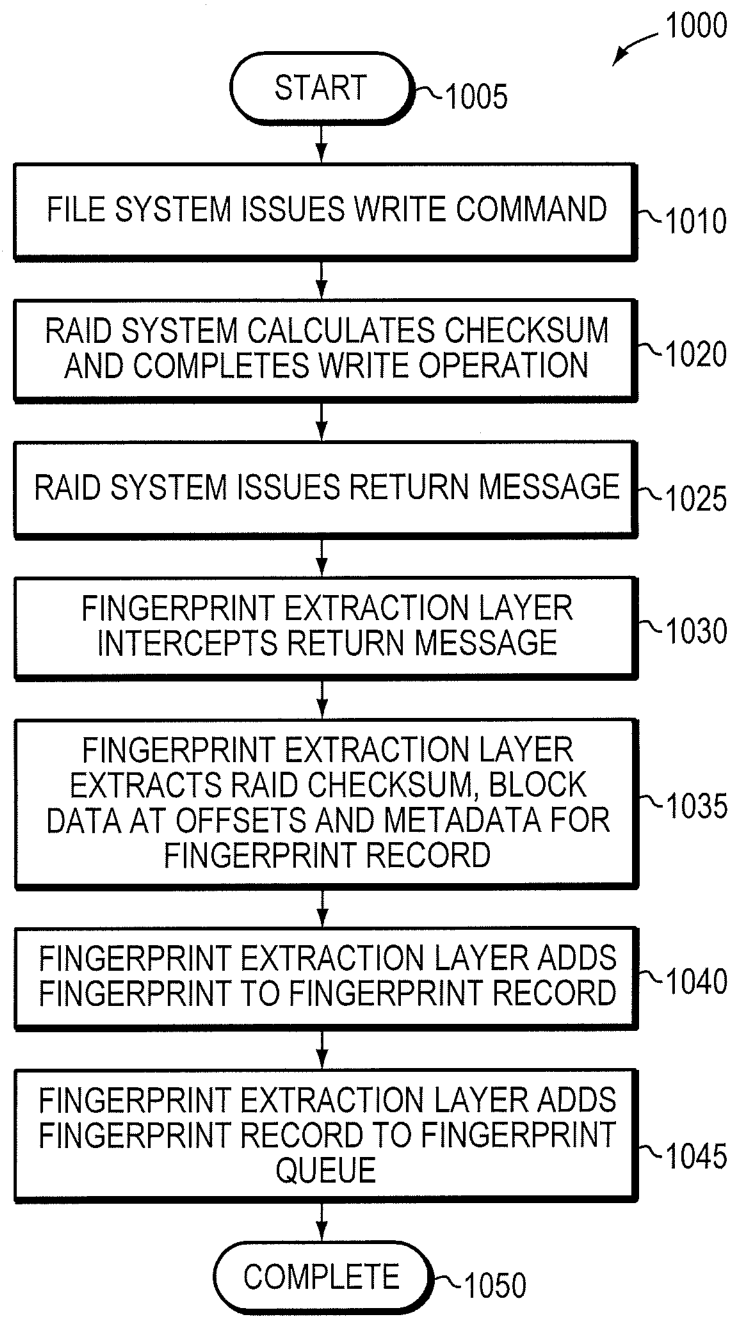
FIG. 10 is a flowchart detailing the steps of a procedure for generating a fingerprint record in accordance with an illustrative embodiment.

FIG. 10 is a flowchart detailing the steps of a procedure 1000 for generating a fingerprint record 900 in accordance with an illustrative embodiment described herein. It should be noted that the novel technique for the removal of stale fingerprints does not depend on the technique for generating fingerprint records. As such, procedure 1000 should be taken as exemplary only. The procedure 1000 begins at step 1005 and proceeds to step 1010 where the file system 280 of the storage operating system 200 issues a write command to the RAID system 240. For example, the write command may originate from a client connected to the storage system 120 and may be a command to write a new data block 406 of a new data container. Alternatively, the write command may be a command to modify the data of a preexisting data container by allocating a new data block 406 according to the write anywhere file layout.

At step 1020, the RAID system calculates a 32-bit checksum value of the block and completes the write operation, e.g., by sending the operation through the disk driver system 250. At step 1025, the RAID system 240 then returns a confirmation message to the file system 280. Note that other storage protocols, i.e., other than the RAID protocol, may be implemented to execute the write operation and to return a value as the checksum value. At step 1030, the fingerprint extraction layer 286 intercepts and/or monitors the confirmation message from the RAID system 240. At step 1035, the fingerprint extraction layer 286 extracts the 32-bit checksum value from the confirmation message and copies this value into the RAID checksum field 805 of the fingerprint 800. The fingerprint extraction layer 286 also samples 32 bits of data of the data block 406 at one or more offsets and copies this data into the sample data field 810 of the fingerprint 800 thus generating a 64-bit fingerprint 800. Additionally, the fingerprint extraction layer 286 extracts metadata associated with the data block 406. The fingerprint record 900 is then generated (e.g., by allocating one or memory entries to store the fields of the fingerprint record 900), and the extracted metadata is copied to appropriate fields of the fingerprint record 900. According to an alternate embodiment, the fingerprint extraction layer 286 may be triggered, in response to the write command, to generate data for the fields based on data provided by the file system 280. At step 1040, the fingerprint 800 is added to the fingerprint record 900 and at step 1045, the fingerprint record 900 is added to the fingerprint queue 287, where newly generated fingerprints 800 are accumulated for batch processing by the deduplication module 284, as described below in reference to FIG. 11. At step 1050, the procedure 1000 completes.

Note that, according to alternate embodiments, the fingerprint record generation procedure 1000 may occur periodically or in response to a predefined condition, such as an administrator command being received from the UI 275, rather than during write operations. In such embodiments, the file system 280 may scan the disk array 160, or a portion thereof, to generate the fingerprint records 900.

Illustratively, the data deduplication module 284 may periodically compare the fingerprints 800 of the records 900 to identify duplicate fingerprints, which, in turn, indicate duplicate data blocks. Note that, according to an illustrative embodiment, a pair of duplicate fingerprints might be "false positives", meaning they do not correspond to actual duplicate data blocks. Therefore, prior to deduplication, the identified data blocks may be compared byte-by-byte to verify that they are actual duplicates. Illustratively, where each fingerprint 800 comprises a 32-bit RAID checksum and 32 bits of sample data, storage system processing resources are conserved during the fingerprint record generation procedure 1000 in exchange for a probability of false positives during data deduplication. However, the probability of false positives is sufficiently low (approximately 100 false positives per 4 billion data blocks) that the amount of processor resources conserved by using pre-calculated data to generate the fingerprint 800 outweighs the amount of processor resources expended by performing byte-by-byte comparisons during data deduplication. Additionally, the deduplication process may be executed during periods of low system activity, e.g., late at night or on weekends. Therefore, references to "identical" or "duplicate" data blocks, as used herein, should be interpreted to possibly include a low percentage of data blocks that are not, in fact, duplicates (i.e., false positives).

According to alternate embodiments, however, different values may be copied into the RAID checksum and sample data fields 805, 810, and/or additional fields 815 may be implemented in each fingerprint 800. For example, the fingerprint 800 may include, e.g., the result of a cryptographic hash function that guarantees a zero probability of false positives. Therefore, according to alternate embodiments, performing byte-by-byte data block comparisons during data deduplication may be unnecessary.

F. Identifying Duplicate Data Blocks

Figure 11:
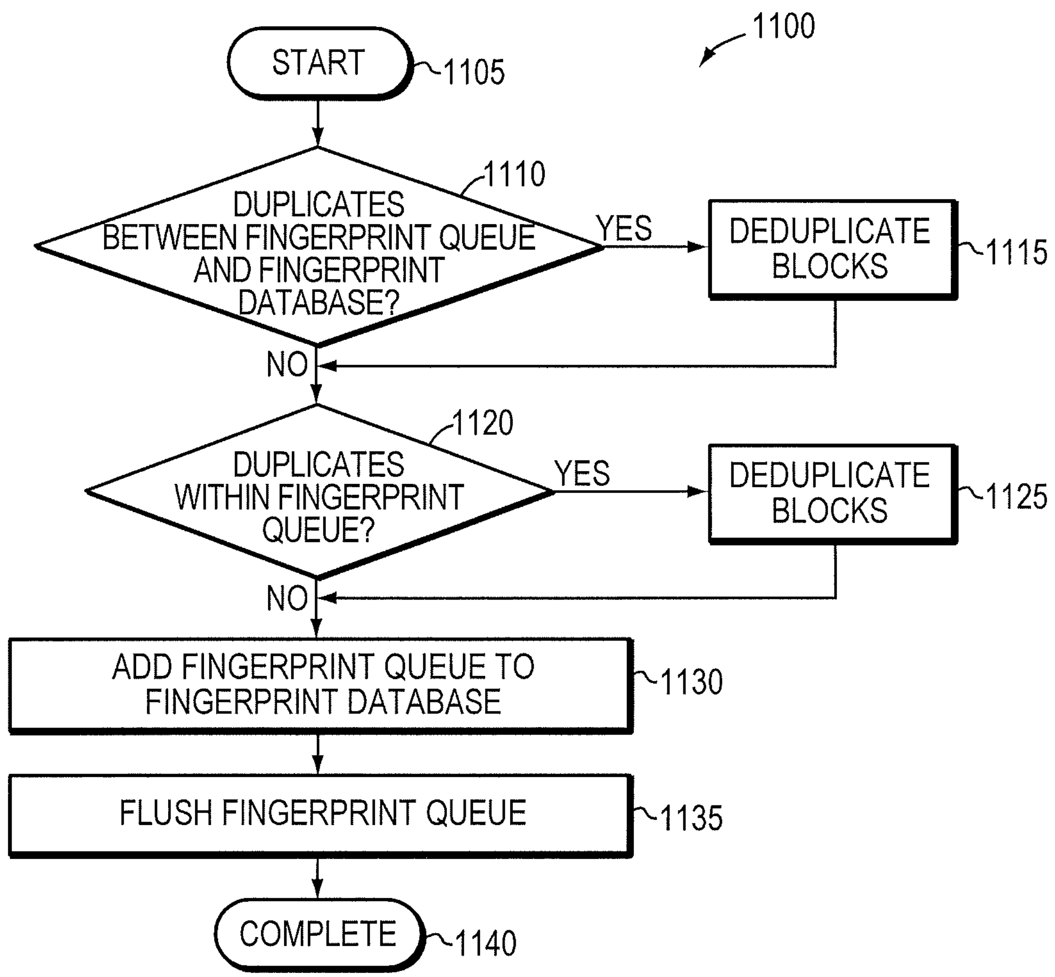
FIG. 11 is a flowchart detailing the steps of a procedure for identifying duplicate data blocks in accordance with an illustrative embodiment.

FIG. 11 is a flowchart detailing the steps of a procedure 1100 for identifying duplicate data blocks 406 in accordance with an illustrative embodiment described herein. The procedure 1100 begins at step 1105 and continues to step 1110, where fingerprints 800 (contained in fingerprint records 900) stored in the fingerprint queue 287 are compared to fingerprints stored in the fingerprint database 288. If any of the fingerprints are identical, the procedure 1100 continues to step 1115 where the deduplication module 284 performs data deduplication, e.g., by performing byte-by-byte comparisons between the data blocks associated with the identical fingerprints followed by modifying pointers in indirect blocks. At step 1120, fingerprints stored in the fingerprint queue 287 are then compared to other fingerprints stored in the fingerprint queue 287. Illustratively, the comparison is a bitwise comparison between two fingerprints 800, performed by the deduplication module 284. According to alternate embodiments, the comparison may be, e.g., bytewise and/or another method of identifying identical data. If any of the fingerprints are identical, the procedure 1100 continues to step 1125 where the deduplication module 284 performs data deduplication, as illustrated above in reference to FIGS. 5, 6, and 7. The procedure 1100 then continues to step 1130, where the resulting deduplicated fingerprint records 900 stored in the fingerprint queue 287 are copied to the fingerprint database 288. At step 1135, the fingerprint queue 287 is then flushed, i.e., all fingerprint records in the fingerprint queue 287 are deleted. The procedure 1100 then completes at step 1140.

Notably, according to an illustrative embodiment, the above-described procedure 1100 may be executed on an active file system. Therefore, there may be more than one fingerprint queue 287 present in the storage operating system 200. While deduplication module 284 is accessing one of the queues, write operations may continue during the procedure 1100, with newly generated fingerprint records 900 being stored to a second fingerprint queue or to a temporary memory location. By storing newly generated fingerprint records in a fingerprint queue 287, rather than in the fingerprint database 288, fingerprints 800 corresponding to newly-written or recently-modified data blocks may be "batched" for processing as a group. Alternatively, newly generated fingerprint records 900 may be stored directly to the fingerprint database 288 for immediate comparison and processing. The fingerprint database 288 may also be sorted according to the order of fingerprint creation, effectively creating a fingerprint queue at one end of the fingerprint database 288, which may then be processed as a batch according to procedure 1100, without requiring a separate fingerprint queue 287. According to yet another alternate embodiment, newly generated fingerprint records 900 may be stored directly to the fingerprint database 288 and sorted according to values of the fingerprints 800, with the deduplication module 284 periodically scanning the entirety or sections of the fingerprint database 288 for duplicates.

G. Eliminating Stale Fingerprints

The present invention provides a technique for eliminating stale fingerprints from a fingerprint database. More generally, the technique described herein may efficiently remove any overlapping ranges of entries in a flat sorted data structure, such as fingerprint database 288, of storage system 120. The ranges of entries represent fingerprints 800 that have become stale, i.e., are not representative of current states of corresponding blocks in the file system, due to various file system operations such as, e.g., deletion of a data block without overwriting its contents. Periodically, in response to either a user interface command or in response to certain thresholds being met, the deduplication module 284 of file system 280 performs a fingerprint verification procedure 1200 to remove the stale fingerprints from the fingerprint database 288. Advantageously, the fingerprint verification procedure reduces the size of the fingerprint database 288 and increases the speed of searches in the database, while also improving data de-duplication efficiency.

Figure 12:
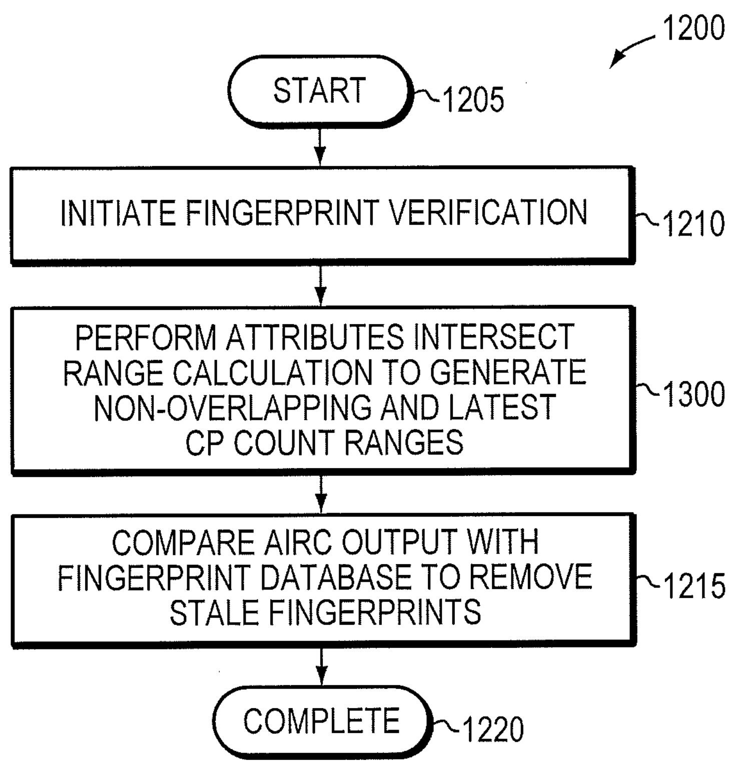
FIG. 12 is a flowchart detailing the steps of a procedure for performing a fingerprint verification in accordance with an illustrative embodiment of the present invention.

FIG. 12 is a flowchart detailing the steps of a procedure 1200 for performing fingerprint verification in accordance with an illustrative embodiment of the present invention. The procedure 1200 begins in step 1205 and continues to step 1210 where the fingerprint verification procedure is initiated by, for example, an administrator entering a command in the UI 275 of storage system 120. Alternatively, fingerprint verification may be initiated in response to a certain thresholds being met. An exemplary threshold may be a predetermined size of the stale fingerprint data structure 289. That is, the verification procedure 1200 may be performed in response to the de-duplication module 284 detecting that the stale fingerprint data structure 289 has exceeded a predetermined size. As noted, the stale fingerprint data structure 289 is configured to log stale fingerprints as they are generated in the file system, i.e., in response to the file system executing operations that generate the stale fingerprints. In an illustrative embodiment, the stale fingerprints (FBNs) are logged as a list that includes their associated inodes to facilitate further processing, e.g, sorting, as described herein. In accordance with an illustrative embodiment, the list of stale fingerprints may be sorted into an inode order, e.g., in an increasing inode number order. Accordingly, the exemplary threshold may further comprise the inode sorted list exceeding a predetermined size.

In Step 1300, an attributes intersect range calculation (AIRC) is performed on the stale fingerprint data structure 289 to generate an output of nonoverlapping and latest CP count ranges, as described further below in reference to FIGS. 13A and B. The output of the AIRC procedure is then compared with the fingerprint database 288 to remove stale fingerprints in step 1215. The output of the AIRC procedure may be efficiently compared with the fingerprint database to remove all of the stale fingerprints in a single simultaneous traversal of the database, i.e., the AIRC procedure only needs to traverse the fingerprint database once to remove all stale fingerprints. As the output of the AIRC procedure is a set of the most recent non-overlapping ranges, the database may be easily traversed to remove those stale fingerprints older than the identified ranges. In other words, for a given FBN, the output of the AIRC procedure identifies the most recent stale fingerprint and, as the fingerprint database is traversed, all fingerprints that are older than the most recent stale fingerprint are removed, including the most recent stale fingerprint.

For example, assume that part of the output of the AIRC procedure is an FBN tuple (X, Y, C5) where X represents a starting FBN value, Y represents an ending FBN value and C5 represents a CP count. Further, assume that FBN Z (wherein Z is located in the range between X and Y) has a plurality of fingerprints in the fingerprint database associated with CP counts C1, C3, C5 and C8. This may be the result of various file system operations occurring to the data block associated with FBN Z, e.g., deletion of the block, hole punching operations, etc. As a result of these operations, stale fingerprints associated with FBN Z have accumulated in the fingerprint database. While traversing the fingerprint database, the procedure identifies those fingerprints associated with CP counts C1, C3 and C5 as being stale and removes them from the fingerprint database 288, thereby leaving only the fingerprint 800 associated with CP count C8. In this manner, the overlapping (and stale) fingerprints are removed from the database. It should be noted that this example is written in terms of a single FBN; however, in operation, a range of FBNs will have overlapping and stale fingerprints removed during traversal of the database. As such, the description of a single FBN should be taken as exemplary only. This provides a noted advantage over the prior art BST approach where multiple passes through the fingerprint database are required. Once the stale fingerprints have been removed from the fingerprint database, the output of the AIRC procedure may be deleted. The procedure 1200 then completes in step 1230.

Figure 13A:
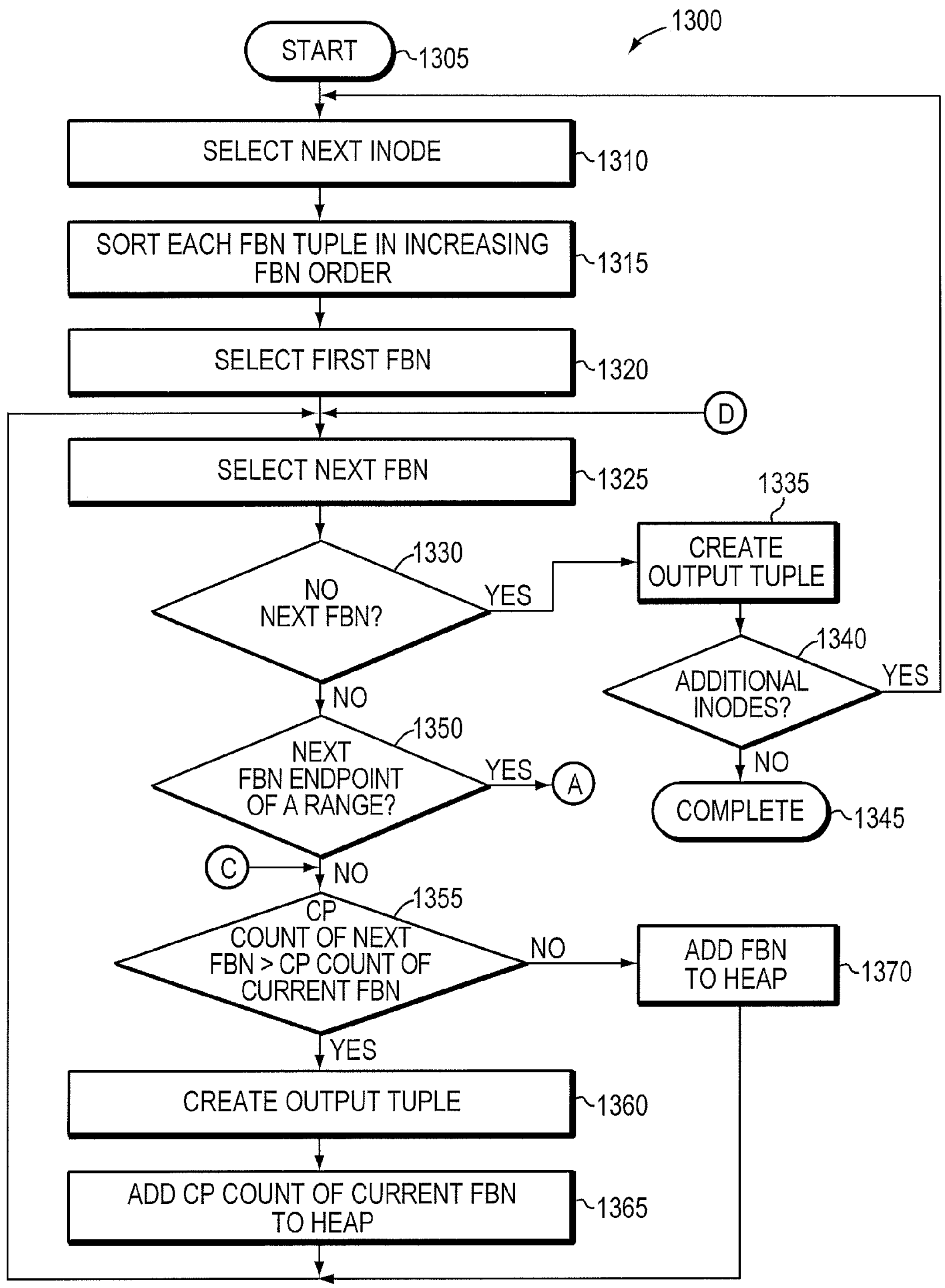
FIGS. 13A and 13B are flowcharts detailing the steps of a procedure for performing an attributes intersect range calculation (AIRC) in accordance with an illustrative embodiment of the present invention.
Figure 13B:
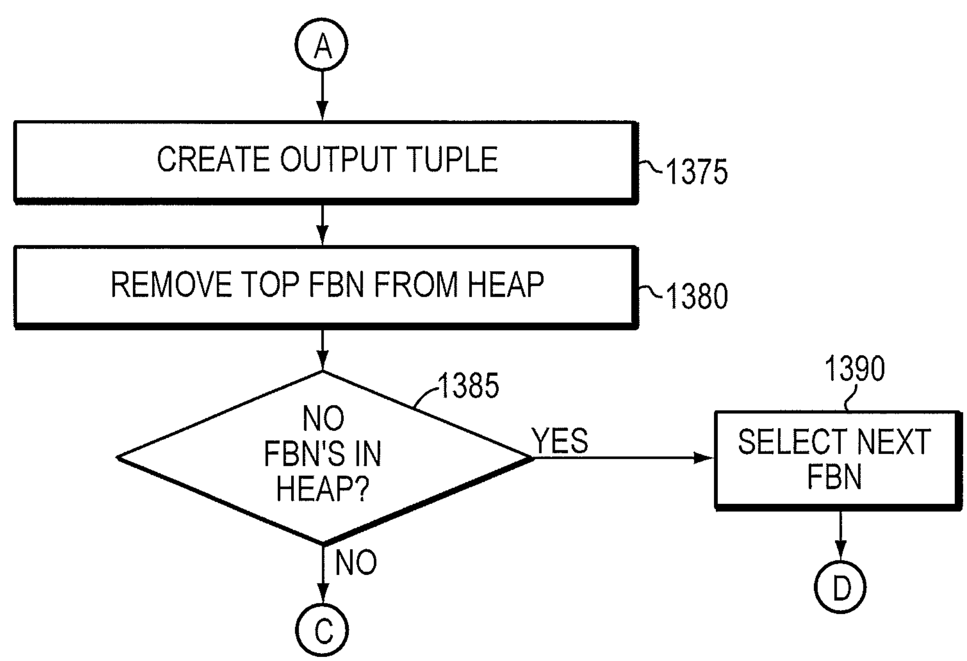

FIGS. 13A and 13B are flowcharts detailing the steps for performing an AIRC procedure 1300 in accordance with an illustrative embodiment of the present invention. The procedure 1300 begins in step 1305 and continues to step 1310 where an inode from the stale fingerprint data structure 289 is selected. As each inode is associated with a particular data container, e.g., a file, selection of an inode results in selection of the file associated with the inode and thus enables processing of all of the FBNs associated with the selected file. In step 1315, each FBN tuple associated with the selected inode is sorted into a predefined order. In an illustrative embodiment, the predefined order is an increasing FBN order, although it will be understood that other ordering may be employed. A first FBN (i.e., the one with the lowest FBN value) of the sorted FBNs is then selected in step 1320. A second FBN (i.e., the one following the first FBN) is also selected in step 1325. More generally, as procedure 1300 progresses, the next FBN in the sorted list is selected in step 1325. A determination is made in step 1330 as to whether there is a next FBN. If it is determined that there is no next FBN, the procedure 1300 has completed processing each of the FBNs associated with the selected inode and the procedure branches to step 1335 where an output tuple is created. Illustratively, the output tuple is a FBN tuple of the form (Starting FBN value, Ending FBN value, Consistency Point value). The output tuples are illustratively stored in a temporary data structure (not shown), such as a file, until they can be compared with the fingerprint database 288 to remove stale fingerprints. The set of output tuples includes a set of non-overlapping ranges of FBNs associated with a given inode. By utilizing the output tuples, the verification procedure may quickly identify those ranges that overlap with the output tuples and remove the overlapping ranges, which represent stale fingerprints in the fingerprint database.

Once the output tuple is created in step 1335, a determination is made whether additional inodes need to be checked (step 1340). If there are no additional inodes to be checked, the procedure 1300 completes in step 1345. However, if in step 1340 it is determined that additional inodes need to be checked, the procedure loops back to step 1310 and the next inode is selected. The procedure then continues as described above.

If, in step 1330, it is determined that there are additional FBNs, the procedure continues to step 1350 where a determination is made whether the next FBN in the sorted list of FBNs is an endpoint of a range. Such a determination may be made by examining the FBN tuple containing the current FBN. As each tuple identifies starting and ending FBN values, the procedure may determine the endpoint of a range by examining the ending FBN value of the tuple.

If the next FBN is not the endpoint of a range, the procedure continues to step 1355 where a determination is made whether the CP count associated with the next FBN is greater than the CP count of the current FBN. If it is determined that the CP count associated with the next FBN is greater than the CP count of the current FBN, then the fingerprint for the next FBN was created at a later point in time than the current FBN. As a result, the procedure creates an output tuple in step 1360. The CP count of the current FBN is then added to a reserved portion of memory, e.g., a heap, in step 1365 before the procedure loops back to step 1325 to select a next FBN.

In an illustrative embodiment described herein, the procedure 1300 maintains the heap for temporarily storing entries. As is well known to those skilled in the art, the heap may be embodied as a tree-based data structure that satisfies the heap property, i.e., that the element with the greatest key is always in the root node of the tree data structure. Illustratively, the AIRC procedure utilizes the CP count as the key, such that the element in the heap that has the greatest CP count is always the root of the heap tree structure. It should be noted that in alternative embodiments, other data structures may be utilized in place of the heap. A noted advantage of utilizing a heap is that insertion and heapify operations may be performed in O(n log n) complexity, which is significantly better than the $O(n^2)$ used in a binary search tree techniques. An insertion operation adds a new entry to the heap. A heapify operation rearranges the heap so that the entry with the greatest key is moved to the top of the heap. In accordance with an illustrative embodiment, whenever a new entry is added to the heap, a heapify operation is performed so that the root (maximum) node is located at the top of the heap, i.e., the node with the highest CP count is located so that it is the first to be removed from the heap.

If in step 1355 it is determined that the CP count of the next FBN is not greater than the CP count of the current FBN, the procedure branches to step 1370 where the FBN is added to the heap. Once the FBN has been added to the heap (and the appropriate heapify operation has been performed), the procedure branches back to step 1325 to select the next FBN.

If in step 1350 the next FBN is determined to be the endpoint of a range, the procedure branches to step 1375 where an output tuple is created. The procedure then removes the top FBN from the heap in step 1380. A determination is made in step 1385 whether there are any further FBNs in the heap, i.e., whether the removal of the top FBN has failed or not. If there are no further FBNs in the heap, the procedure then selects a next FBN in step 1390 which becomes a first FBN before looping to step 1325 to select a second FBN. If it is determined in step 1385 that there are FBNs in the heap, then the procedure continues to step 1355 where processing continues as described above.

Figure 14:
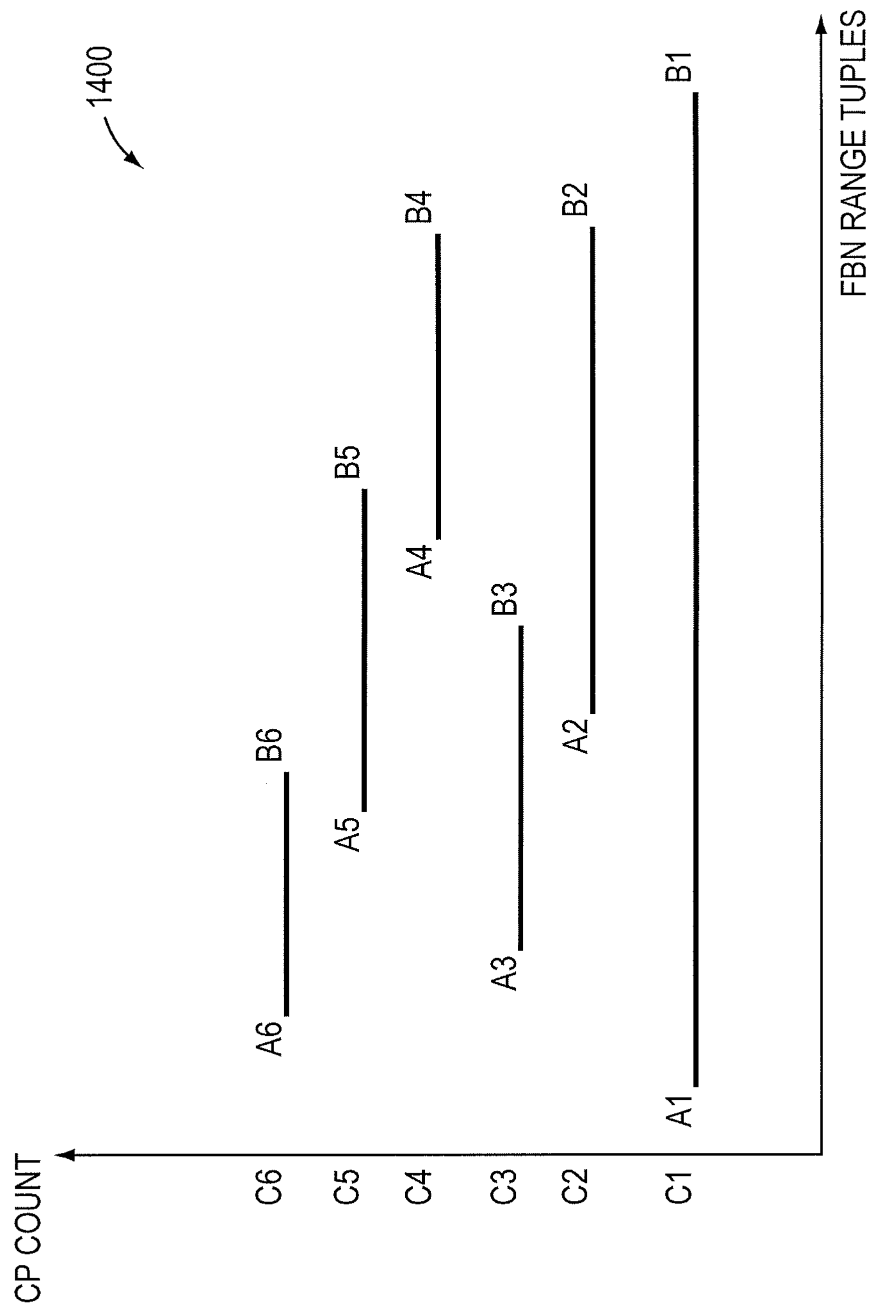
FIG. 14 is a diagram illustrating overlapping ranges of file block numbers and consistency points in accordance with an illustrative embodiment of the present invention.

FIG. 14 is a diagram illustrating a plurality of overlapping FBN range tuples 1400, wherein the X-axis identifies FBN range tuples and the Y-axis identifies CP count values. For example, the FBN range tuple A1, B1 is associated with CP count C1, whereas the FBN range tuple A3, B3 is associated with CP count C3. The AIRC procedure 1300 sorts the FBN range tuples for a particular file/inode into nonoverlapping and latest CP count ranges by removing the overlapping portions of the range tuples; that is, to identify the latest CP count for a range of FBN tuples.

More specifically, applying the AIRC procedure to the exemplary FBN range tuples of FIG. 14, the n FBN range tuples (Ai, Bi) are sorted in increasing FBN order. A 2n sized list (n FBN range tuples of two elements, i.e., Ai, Bi) is then sorted, e.g., from left-to-right of FIG. 14, to the order (A1, A6, A3, . . . , B4, B2, B1). That is, beginning at A1, the procedure continues until it encounters A6, which has a greater CP count value than the current element (i.e., A1). As such, an output tuple (A1, A6, C1) is created (see step 1360). This tuple identifies the region between A1 and A6 located at C1 as the most recent. Accordingly, the FBN tuple (C1, B1) is inserted onto the heap (see step 1365). The procedure then continues until it encounters the next element A3; however A3 is associated with CP count C3, which is less than the CP count C6 associated with A6. Thus, an FBN tuple (C3, B3) is added to the heap (see step 1370). When B6 is identified as the endpoint of FBN range A6, B6, an output tuple (A6, B6, C6) is generated. This process continues until all the FBNs associated with the inode have been processed.

The foregoing description has been directed to specific embodiments of this invention. It will be apparent, however, that other variations and modifications may be made to the described embodiments, with the attainment of some or all of their advantages. It is expressly contemplated that the procedures, processes, and methods described herein may be implemented in alternative orders. Furthermore, the teachings of this invention can be implemented as software (including a computer-readable medium having program instructions executing on a computer), hardware, firmware, or a combination thereof. While this description has been written in terms of a file system, the present invention also may be utilized with non-file system storage, such as luns and/or other block based storage. Accordingly this description is to be taken only by way of example and not to otherwise limit the scope of the invention. Therefore, it is the object of the appended claims to cover all such variations and modifications as come within the true spirit and scope of the invention.

What is claimed is:

1. A computer implemented method for removing one or more stale fingerprints from a fingerprint database the method comprising:

sorting a list of stale fingerprints stored in a stale fingerprint data structure into an inode number order;

performing an attributes intersect range calculation on the sorted list that computes a non-overlapping and latest consistency point (CP) range, wherein the attributes intersect range calculation comprises determining a tuple that defines the non-overlapping and latest CP range, wherein the tuple includes a starting value, an ending value, and a CP count associated with a given inode; and comparing the non-overlapping and latest CP range with the fingerprint database wherein the comparing includes:

determining whether an identifier, associated with a block of data, is located between the starting value and the ending value, in response to determining that the identifier is located between the starting value and the ending value, determining whether one or more selected fingerprints associated with the block of data and in the fingerprint database have a specific CP count that is less than or equal to the CP count contained in the non-overlapping and latest CP range, and removing from the fingerprint database the one or more selected fingerprints associated with the block of data and in the fingerprint database that have the specific CP count that is less than or equal to the CP count contained in the non-overlapping and latest CP range, wherein the one or more selected fingerprints that have the specific CP count that is less than or equal to the CP count are stale fingerprints.

2. The computer implemented method of claim 1 wherein the comparing further includes maintaining one or more other fingerprints associated with the block of data in the fingerprint database that have one or more other CP counts that are greater than the CP count contained in the non-overlapping and latest CP range.

3. The computer implemented method of claim 1 wherein a stale fingerprint includes a checksum value.

4. The computer implemented method of claim 3 further comprising computing the checksum value during execution of a storage system operation.

5. The computer implemented method of claim 1 further comprising logging fingerprints associated with file block numbers to which a specified operation has been performed to generate the list of stale fingerprints in the stale fingerprint data structure.

6. The computer implemented method of claim 5 wherein the specified operation is selected from a group consisting of file deletion, file truncation and hole punching.

7. The computer implemented method of claim 1 wherein comparing the non-overlapping and latest CP range with the fingerprint database to remove the one or more stale fingerprints from the fingerprint database is performed in a single pass through the fingerprint database.

8. The computer implemented method of claim 1 wherein performing the attributes intersect range calculation on the sorted list further comprises:

selecting a first inode;

sorting each file block number associated with the selected first inode in a predefined file block number order; and traversing a set of file block number tuples to identify the non-overlapping and latest CP range.

9. The computer implemented method of claim 8 wherein the predefined file block number order comprises an increasing file number block order.

10. The computer implemented method of claim 1 wherein the starting value is a starting file block number, the ending value is an ending file block number, and the identifier is a file block number associated with the data block.

11. A system comprising:

a processor; and a computer-readable medium comprising program instructions executable by the processor to cause the system to, perform an attributes intersection range calculation on a stale fingerprint data structure, wherein the program instructions to perform the attributes intersection range calculation comprise instructions executable to cause the system to determine a tuple that defines a non-overlapping and latest consistency point (CP) range including a starting value, an ending value, and a CP count associated with a given inode, compare a fingerprint database with the non-overlapping and latest CP range, wherein the program instructions to compare comprise program instructions executable by the processor to cause the system to:

determine whether an identifier, associated with a block of data, is located between the starting value and the ending value, in response to determining that the identifier is located between the starting value and the ending value, determine whether one or more selected fingerprints associated with the block of data and in the fingerprint database have a specific CP count that is less than or equal to the CP count of the non-overlapping and latest CP range, and remove from the fingerprint database the one or more selected fingerprints associated with the block of data and in the fingerprint database that have the specific CP count that is less than or equal to the CP count of the non-overlapping and latest CP range, wherein the one or more selected fingerprints that have the specific CP count that is less than or equal to the CP count are stale fingerprints.

12. The system of claim 11 wherein the computer-readable medium further comprises program instructions executable by the processor to cause the system to maintain one or more other fingerprints associated with the block of data in the fingerprint database that have one or more other CP counts that are greater than the CP count contained in the non-overlapping and latest CP range.

13. The system of claim 11 wherein the stale fingerprints are generated from a specified file system operation.

14. The system of claim 13 wherein the specified file system operation is selected from a group consisting of file deletion, file truncation and hole punching.

15. The system of claim 13 wherein the computer-readable medium further comprises program instructions executable by the processor to cause the system to perform the attributes intersection range calculation on a periodic basis.

16. The system of claim 11 wherein the non-overlapping and latest CP range is deleted after removal of the one or more selected fingerprints from the fingerprint database.

17. The system of claim 11 wherein each stale fingerprint includes a checksum value.

18. The system of claim 17 wherein the checksum value comprises a RAID checksum value.

19. The system of claim 17 wherein the computer-readable medium comprises program instructions executable by the processor to cause the system to generate the checksum during execution of a storage operation.

20. A non-transitory computer readable storage medium containing executable program instructions for execution by a processor, the program instructions executable to:

sort a list of stale fingerprints into a predefined order, wherein the stale fingerprints are associated with file block numbers to which a specified operation has been performed;

perform an attributes intersect range calculation on the sorted list, wherein the program instructions to perform the attributes intersect range calculation comprises program instructions executable to determine a tuple that defines a non-overlapping and latest consistency point (CP) range, wherein the tuple includes a starting value, an ending value, and a CP count associated with a given inode; and compare the non-overlapping and latest CP range with a fingerprint database, wherein the program instructions that compare comprise program instructions executable to:

determine whether an identifier, associated with a block of data, is located between the starting value and the ending value, in response to determining that the identifier is located between the starting value and the ending value, determine whether one or more selected fingerprints associated with the block of data and in the fingerprint database have a specific CP count that is less than or equal to the CP count contained in the non-overlapping and latest CP range, remove from the fingerprint database the one or more selected fingerprints associated with the block of data and in the fingerprint database that have the specific CP count that is less than or equal to the CP count contained in the non-overlapping and latest CP range, wherein the one or more selected fingerprints that have the specific CP count that is less than or equal to the CP count are stale fingerprints.

* * * * *